March 12, 1929.  A. E. PAIGE  1,704,868
VEHICLE LOCK AND SIGNALING DEVICE
Filed Jan. 26, 1924  2 Sheets-Sheet 1
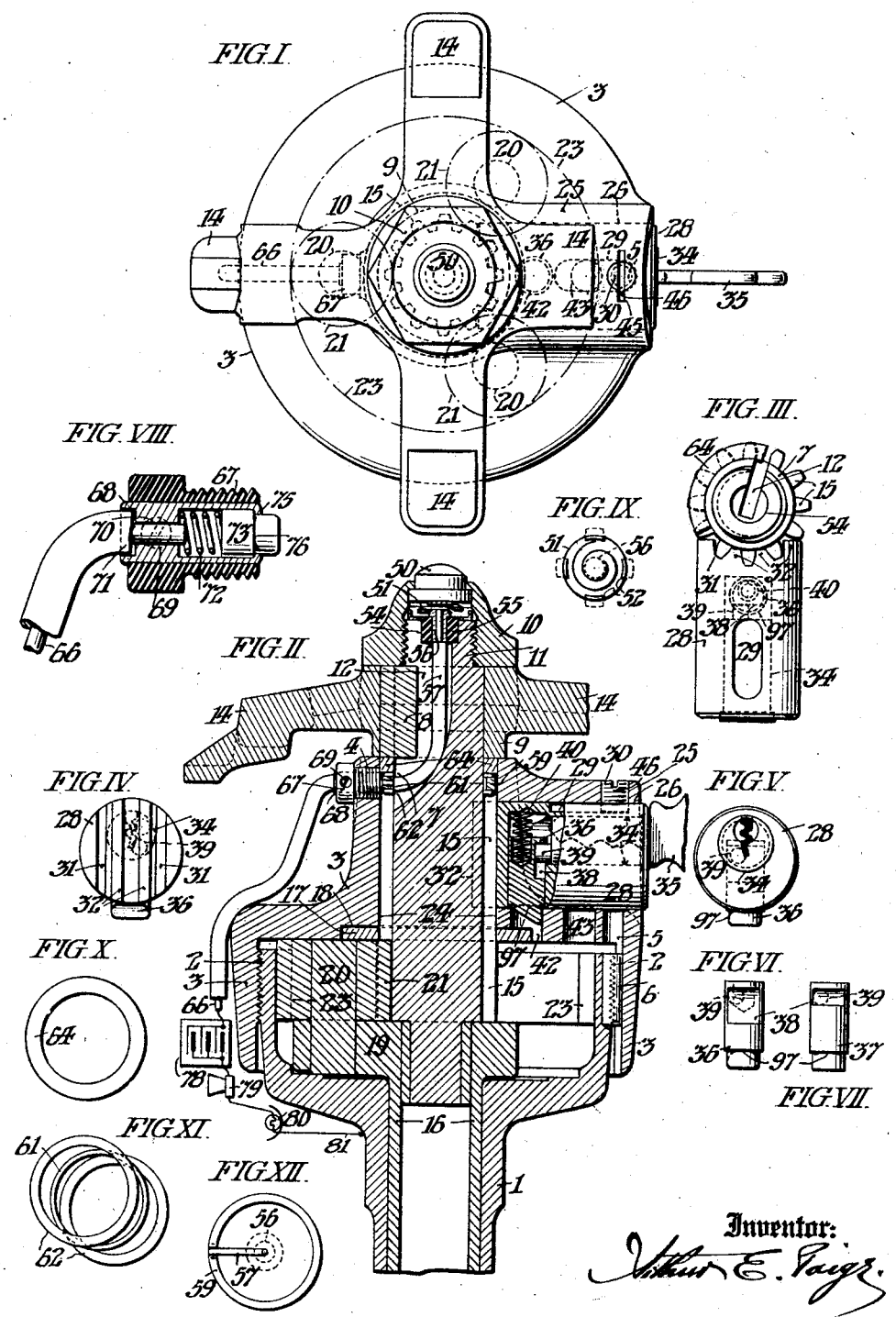

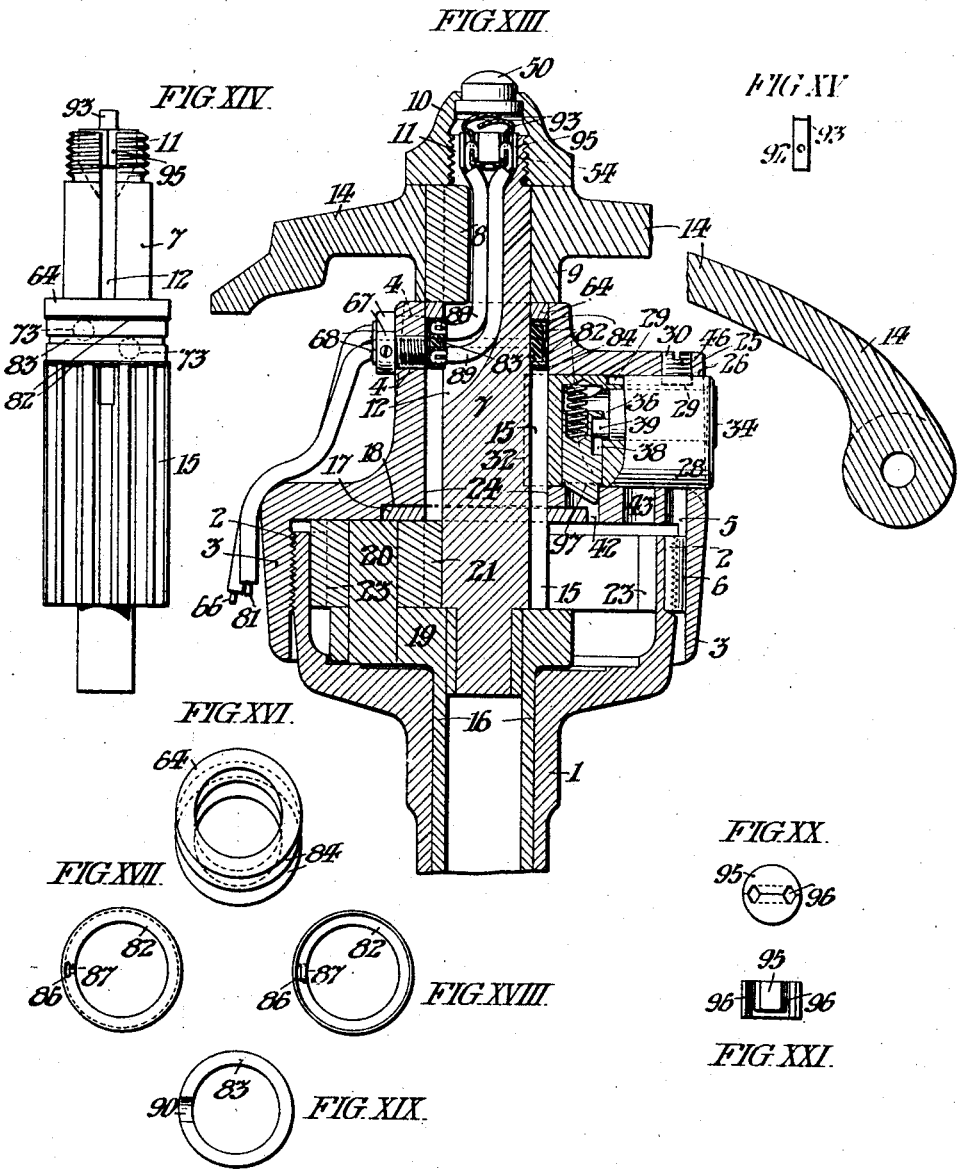

Patented Mar. 12, 1929.

1,704,868

UNITED STATES PATENT OFFICE.

ARTHUR E. PAIGE, OF PHILADELPHIA, PENNSYLVANIA.

VEHICLE LOCK AND SIGNALING DEVICE.

Application filed January 26, 1924. Serial No. 688,819.

My invention is particularly applicable to steering mechanism for self-propelled vehicles, such as automobiles, motor boats, airplanes, etc., including a steering shaft provided with a rotary steering wheel mounted to turn in a tubular column or post, and provides locking means for detachably rigidly connecting the steering shaft with the steering column, so as to prevent the vehicle from being steered when locked, and means whereby an electric circuit, for instance, a signaling system in the vehicle, is arranged to be controlled by a switch appliance upon the steering shaft in cooperative relation with a terminal or terminals held stationary by said column.

Although the locking mechanism which I have chosen for illustration includes a lock body, of a pin key type, which is mounted to reciprocate radially in a casing formed in a screw cap which serves as a cover of the internal gear case which is a stationary fixture at the top of the steering column of the "Ford" type, and thus resembles the structure shown in Letters Patent of the United States 1,425,408 granted to James A. Murphey August 8, 1922; in that patented structure the steering shaft is provided with a primarily separate sleeve having recesses to engage the lock body, and it is necessary to employ the key both to set the lock body in engagement with said sleeve, and to effect its withdrawal from such engagement. On the contrary, in the form of my invention herein shown, the steering shaft is provided with means in unitary relation therewith arranged to directly engage the lock body, without the interposition of any sleeve, and the lock body may be engaged with the steering shaft, to render the steering mechanism inoperative, without the employment of the key; the latter being required only to release and effect the withdrawal of the lock body from its locked position. Therefore, my improvement in that respect is advantageous, first, in that it is less costly to construct and, second, that it is more convenient to operate.

Moreover, in electric signaling systems of the prior art, a push button is carried by the steering wheel and connected with the other parts of the system by flexible wires secured at one end upon the steering wheel and at the other end upon some stationary part of the vehicle, necessitating the provision of a considerable extent of such wires, so disposed that they may be coiled or uncoiled, or otherwise flexed, with every movement of the steering wheel throughout the complete rotation of the latter in either direction with reference to the stationary steering column. Such wires are not only unsightly and inconvenient in that they extend in such position that they must be continually avoided by the operator, but the repeated flexure to which they are subjected tends to loosen their terminal connections and thus render the circuit inoperative, whereas, it is, of course, highly desirable to maintain it continuously operative.

Therefore, a purpose and effect of my present invention are to provide a construction and arrangement avoiding the necessity for employment of any such flexible conductors between the rotary steering wheel and the stationary steering column, and to provide means to otherwise effect the desired electrical connections. In the form of my invention hereinafter described, all of the parts of the electrical system which are movable by the wheel are in fact carried by the steering shaft independently of the wheel, and include a push button terminal at the upper end of said shaft, in coaxial relation therewith, connected by a wire with an annular contact band encircling said shaft but insulated therefrom; said wire being extended between said terminal and said band in a radially extending slot in said shaft, which slot also serves as a seat for the spline key whereby said shaft is connected with the steering wheel.

My invention includes the various novel features of construction and arrangement hereinafter more definitely specified.

In said drawings; Fig. I is a fragmentary plan view of a steering wheel and appurtenant mechanism conveniently embodying my invention. Fig. II is a vertical sectional view of said structure, with a diagram of a signaling circuit. Fig. III is a plan view of the steering shaft and lock body in the interlocked relation in which the steering mechanism is rendered inoperative. Fig. IV is an inner end view of the lock body indicated in Fig. III showing the transverse corrugations in said body which interengage the teeth on said shaft. Fig. V is an outer end view of said lock body shown in Fig. III. Fig. VI is an elevation of the transversely reciprocatory spring pressed plunger which normally extends transversely from said lock body, as indicated in Fig. V, but is arranged to be retracted into said lock body by turning the lock key. Fig. VII is an elevation of a modified form of locking plunger, similar to that shown in Fig. VI, but so constructed and arranged that the key must be employed in connection therewith both to fit the lock body in locked position and to withdraw it therefrom. Fig. VIII is a fragmentary partly diametrical sectional view of the electric contact device mounted in the column casing cap in Fig. II, but on a larger scale. Fig. IX is a plan view of the push button spring shown in section in Fig. II. Fig. X is a plan view of the ring which tightly fits the steering shaft beneath the steering wheel in Fig. II. Fig. XI is a plan view of the three insulating rings shown in section in Fig. II encircling said steering shaft. Fig. XII is a plan view of the electric contact band shown encircling said shaft in Fig. II and having the conducting wire extending axially with respect to said shaft and provided with the push button terminal at the top thereof. Fig. XIII is a vertical sectional view similar to Fig. I but showing a two-wire circuit including the push button switch. Fig. XIV is a side elevation of the steering shaft and its appurtenances shown in Fig. XIII. Fig. XV is an elevation of one of the spring switch terminals shown in Figs. XIII and XIV. Fig. XVI is a plan view of the metal ring which tightly fits the steering shaft beneath the steering wheel in Fig. XIII, and the insulating rings which have the same diameters. Figs. XVII and XVIII are respectively axially opposite plan views of one of the electric contact bands shown encircling said shaft in Fig. XIII. Fig. XIX is a plan view of the insulating ring which extends between said bands in Fig. XIII. Fig. XX is a plan view of the split insulating bushing which holds the spring switch terminals shown in Fig. XIII. Fig. XXI is an inside face view of one of the halves of said bushing shown in Fig. XX.

In said figures; I have shown a form of my invention adapted for embodiment in an automobile having steering gearing of the "Ford" type, i. e., including a train of planetary gearing. The stationary steering column 1 is provided with the external screw thread 2 adapted to be engaged by the stationary column head cover or cap 3. Said cap has the screw socket 4 extending radially near the upper end thereof to hold the electrical contact device shown in detail in Fig. VIII. Said cap has the key socket 5 adapted to receive a cylindrical key 6 which is driven downward therein across said screw thread 2, to normally prevent said cap from being unscrewed from said column, but which may be driven upward and out as hereinafter described. The steering shaft 7 is mounted to rotate in said column 1 and is operatively connected by the key 8, with the steering wheel hub 9 which is detachably secured on said shaft by the nut 10 engaging the screw thread 11 at the upper end of said shaft. As shown in Fig. II; said key extends in the radial slot 12 in said shaft 7. Said steering wheel conveniently includes the spider 14 extending from said hub 9, and either rigidly or pivotally connected to an annular steering wheel rim; the arm extending to the right from said hub in Fig. I, but broken off, being provided at its outer end with a pivotal connection for a tiltable form of steering wheel, as shown in Fig. XIII.

Said steering shaft 7, known to the trade as the "drive pinion shaft" has, in unitary relation therewith, the pinion teeth 15 forming the "sun" gear of the planetary train. Said shaft 7 is journaled at its lower end in the drive pinion shaft bushing 16 which is rotatable in said column 1 and is held downward therein by the flange ring 17, which is drive fitted around said shaft and extends in a complementary recess 18 in said cap 3, as shown in Fig. II. Said bushing 16 has, at its upper end, the three arms 19 carrying respective stud shafts 20, parallel with said shaft 7. The planetary pinions 21 are mounted to turn upon said stud shafts 20 in mesh with said pinion teeth 15 and in mesh with the internal orbital gear 23, which latter is formed in unitary relation with said column 1.

Said internal gear case cover or cap 3 has the axial bore 24 concentric with the axis of said shaft 7 and fitted to the circumference of said pinion teeth; so that said shaft is thus journaled in said cover 3.

Said internal gear case cover 3 also has, in unitary relation therewith, the lock casing 25 with the radial cylindrical lock socket 26 with which the teeth of said pinion 15 are adapted to successively register in every rotary position of said shaft 7. The primarily separate lock 28 includes a cylindrical body fitted to reciprocate in said lock socket 26; the extent of its reciprocation being limited by the slot 29 in its top, in which the screw 30 extends in rigid relation with said lock casing 25 and in axial alinement with said key seat 5, so that, when said screw 30 is removed, and said lock body withdrawn from its socket, said key 6 may be driven downward into the position shown in Fig. II or may be driven upward and outward from that position.

As shown in Figs. III and IV; the inner end of said lock body 28 is transversely corrugated by an arcuate series of parallel grooves 31 forming ridges 32 fitted to engage anywhere in the circumferential series of locking recesses 33 between the pinion teeth 15 which are in unitary relation with said shaft 7. The rotation of said shaft 7 is thus prevented when said lock body is engaged therewith as indicated in dotted lines in Figs. I and II and in full lines in Fig. III; thus preventing operation of the steering mechanism which is connected to the lower end of said bushing 16.

Said lock 28 has pin tumblers extending radially in the thickest part of its wall around the cylindrical bore formed, eccentric to but parallel with its axis, for the rotary key barrel 34; which barrel is rotatable by the removable key 35, to retract the detent or locking plunger 36 shown in Figs. II and VI or to both project and retract the modified form of plunger 37, shown in Fig. VII. Said body has a transverse, diametrical bore for either of said plungers, intersecting the axes of said body and barrel. Said plungers differ, first, in the axial extent of the transverse, segmental, crank notch 38 therein which is adapted to receive the crank 39 projecting from the inner end of said rotary key barrel 34 and, second, in that the lower end of the plunger 36 is cam inclined as indicated in Fig. II. Each such plunger has a cylindrical spring seat, eccentric to the plunger axis so as to clear its slot and hold a spring 40 tending to project the plunger. Either plunger 36 or 37 is thus adapted for alternate engagement in the detent recesses 42 and 43 in said cap 3, to detain said lock body 28 in either its inner locked position shown or in its outer unlocked position.

When said key 35 is turned to retract the detent plunger 36 from the detent recess 42, and the lock body 28 is withdrawn to the limit of its slot 29, said plunger 36 registers with said recess 43 and is automatically thrust therein, by said spring 40, to hold said lock body 28 out of engagement with said steering shaft 7 and thus permit the vehicle to be steered. Although in such unlocked position, said detent plunger 36 is spring pressed into said detent recess 43, enough to prevent the accidental inward movement of said body 28 to locked position; said body may be thrust inward, by the finger or thumb of the operator, without using said key 35; such movement of the lock body merely causing the cam ended plunger 36 to ride over the inner edge of the recess 43 and be thus thrust into said body 28, against the pressure of said spring 40, until said plunger registers with the detent recess 42 into which it is automatically thrust by said spring to the position shown in Fig. II, to detain said lock body 28 in the locked position above described and best shown in Fig. III.

Said key 35 may be withdrawn from said lock 28 whenever the plunger 36 or 37 is projected, but cannot be withdrawn from the lock when the plunger is retracted into the lock body and, consequently, said key 35 serves as a handle by which said lock body 28 may be reciprocated. Of course, when said screw 30 is withdrawn from said slot 29, said lock body 28 may be withdrawn from its casing 25 in said cover 3, being thus separable as shown in Fig. III. However, in the ordinary use of this form of my invention, said screw 30 remains in the position shown in Fig. II, and said lock 28 is continuously carried in said cover 3 which, as above described, is stationary in the automobile; its rotation and removal from the column 1 being normally prevented by the key 6 aforesaid. In order to prevent accidental dislodgment of said screw 30 from the position shown in the drawings; I prefer to provide a transverse slot 45 in the upper surface of said lock casing 25 with which the slot in said screw 30 is adapted to be registered as shown in Fig. I, and to slightly project the metal of said screw 30 into engagement with said casing 25 in said slot 45 as indicated at 46 in Fig. I, by striking the top of said screw with a center punch. However, such projection of the metal of the screw is only sufficient to prevent its accidental dislodgment and not sufficient to prevent its forcible operation by a screw driver.

Said nut 10 has an axial bore in which the push button 50 is mounted to reciprocate, but said button is normally upheld in the position shown in Fig. II by the spiral spring 51 shown in Figs. II and IX which is interposed between said button and the upper end of said shaft 7. Said spring is conveniently formed of a stamping of sheet metal having tabs 52 which are primarily flat as indicated in dotted lines in Fig. IX but are upturned as shown in full lines in Figs. II and IX, to limit the lateral movement of said spring in said bore, as the latter must be large enough in diameter to permit the insertion of the tool by which said screw thread 11 is formed. Said shaft 7 has the cylindrical seat 54 in the top thereof in which the insulating bushing 55 is tightly fitted to support the push button terminal 56 which is electrically connected with the upper end of the conducting wire 57 which is insulated from said shaft 7 by a suitable covering. The lower end of said wire 57 is electrically connected with the contact band 59, shown in section in Fig. II and and in plan in Fig. XII. Such connection is conveniently effected by wedging the lower end of said wire in a notch in said band as indicated in Fig. XII, but may be effected by soldering the wire to the band. Said band 59 is insulated from said shaft which it encircles by the three rings shown in Fig. XI, which are conveniently formed of vulcanized fiber or paper including the tube 61 which is of the same axial extent as said band 59 and interposed between said band and said shaft, and two similar plane washers 62 which extend around said shaft 7 respectively below and above said band 59, as indicated in Fig. II. The lower one of said plane rings 62 rests upon the upper ends of the pinion teeth 15 and said band and its insulating elements are rigidly secured on said shaft 7 by the ring 64, shown in cross section in Fig. II and in plan in Fig. X, which ring is preferably formed of steel and drive fitted on said shaft 7, so as to form an abutment thereon beneath said hub 9.

I provide means to continuously electrically connect said contact band 59 with the conductor 66, comprising the contact device indicated in Fig. II and shown in detail in Fig. VIII. Said device includes the insulating bushing 67 which is provided with the screw thread engaging the socket 4 in said cap 3. Said bushing 67 carries the metal tube 68 which is held therein by the screw 69 which extends through said bushing in screw threaded engagement with said tube and in position to clamp the end of the wire 66 in the hole 70. The outer end of said tube 68 is countersunk to cover the end of the insulating cover 71 on said wire 66 and thus prevent unsightly raveling thereof. Said tube 68 holds the spring 72 which tends to normally press the cylindrical contact 73 upon said band 59; the escape of said contact 73 from said tube 68 being prevented by the flange 75 which is formed by bending inward the end of said tube 68 to engage the shoulder 76 on said contact 73.

As diagrammatically indicated in Fig. II; said conductors 57 and 66 are included in an electric circuit which also includes any suitable source of electric energy, indicated as a storage battery 78, and any suitable electrically operative signal 79, indicated as a horn. However, it is to be understood that any other electric translating device may be included in said circuit to be operated by the switch mechanism above described. For instance, an incandescent lamp 80 provided with a suitable reflector and constituting a search light. In other words; such switch mechanism may be used to operate either an audible or visible signal, or both, or any other electrically operative device. As indicated in Fig. II; one side of the circuit is established through the metallic frame of the vehicle; by way of the wire 81. Of course, wire conductors may be employed upon both sides of the circuit, extending from the push button switch. For instance, as in the modified form of my invention shown in Figs. XIII to XXI inclusive.

In that form of my invention; two contact devices such as shown in Fig. VIII, and respectively provided with conductors 66 and 81, are mounted in the gear case cap 3 in the obliquely spaced relation indicated by the dotted circles in Fig. XIV; those circles respectively indicating two cylindrical contacts 73. Said contacts are thus respectively arranged to bear upon the two electric contact bands 82 which are L-shaped in cross section, precisely alike, but disposed in axially opposite relation encircling the steering shaft 7, as shown in Figs. XIII and XIV. Said contact bands 82 are held in the spaced relation shown, by the insulating ring 83, shown in section in Fig. XIII and in plan in Fig. XIX. Said two bands 82 are also insulated by the two rings 84 shown in section in Fig. XIII and in plan in Fig. XVI; said rings 84, which are conveniently plane washers of vulcanized fiber, are of the same diameters as the ring 64 which is drive fitted on the shaft 7 so as to form an abutment thereon beneath said hub 9 and to rigidly secure said insulating elements and contact bands on said shaft 7. As indicated in Figs. XIII, XVII and XVIII; each of said contact bands 82 has a perforation 86 adjoining a bight 87 displaced axially from the plane of its transverse flange, to receive and engage the lower end of its conducting wire 88 or 89. As shown in Fig. XIII; said wires 88 and 89 have their lower ends respectively hooked and clinched in engagement with the bights of the contact bands 82; such connection being alike in both bands, but the latter being axially opposed. Said hooked ends of the wires respectively extend in the axially opposite recesses 90 in said insulating ring 83. Said wires 88, 89 extend upwardly in the spline key slot 12 in said shaft 7 and their upper ends are similarly hooked and clinched through respective perforations 92 in the spring switch terminals 93. Said terminals are stampings which are primarily precisely alike but are bent differently in assembling them so that one overlaps the other, as shown in Fig. XIII. As indicated in Fig. XIII; the upper end of one of said spring terminals 93 bears against the under side of the push button 50 to normally uphold the latter and break the circuit between said terminals 93. However, the circuit may be closed by depressing said button to press the upper ends of said terminals 93 in contact with each other. Said terminals 93 are rigidly supported in insulated relation with said shaft 7 in the split insulating bushing 95, one-half of which is shown in Figs. XIII and XXI and both halves of which are assembled in Figs. XIV and XX. As best shown in Fig. XX; said bushing 95 has two sockets 96 for said spring switch terminals 93, formed by oppositely counterpart recesses in the diametrically opposite halves of said bushing which are precisely alike.

It is to be understood that the form of my invention above described, provided with the double wire connections, may be included in circuit with an electric generator and signaling or other translating device as above described with reference to Fig. II.

It may be observed that although said detent plungers 36 and 37 are continually spring pressed outwardly; in the locked position shown in Figs. II and XIII, the portion of the plungers above the crank notch 38 does not bear upon the crank 39. On the contrary, such plungers bear upon the metal of the caps 3, in the lock sockets 26, around the locking recesses 42 and 43, at their shoulders 97, which are formed by making the lower ends of the plungers of less diameter than their upper portions. The purpose and effect of that arrangement is to prevent rattling of the lock bodies 28 in their sockets 26. However, such details of construction and arrangement are not essential to the operation of my invention as above described.

Of course, such an L-shaped contact band as shown at 82 in Fig. XIII may be used in the single wire circuit in lieu of the rectangular band 59 shown in Fig. II.

Moreover, although I have found it convenient to illustrate my invention in connection with steering mechanism of the peculiar "Ford" type; it is to be understood that it is not limited to such an embodiment. Therefore, I do not desire to limit myself to the precise details of construction and arrangement herein set forth, as it is obvious that various modifications may be made therein without departing from the essential features of my invention, as defined in the appended claims.

I claim:

1. The combination with a normally rotary steering wheel and a stationary gear case; of a shaft rigidly connected with said wheel and having a circular series of locking recesses; a cover for said gear case, in which said shaft is journaled and having a lock casing socket with which said locking recesses are adapted to successively register when said wheel is turned; a key lock including a body fitted to said casing socket and a transverse plunger which may be retracted into said body by the key of said lock to permit disengagement of said lock; said plunger having its outer end inclined so as to be thrust inward, automatically, when said body is manually thrust inward in said socket; said plunger being constructed and arranged to be movable inwardly and outwardly independently of said key; and a spring in said body arranged to automatically effect engagement of said lock plunger, independently of said key, to prevent disengagement of said lock, when in locked position, and thus prevent relative rotation of said members, independently of said key; and means whereby said lock casing is prevented from turning with said rotary element.

2. The combination with a normally rotary steering wheel and a stationary gear case; of a shaft rigidly connected with said wheel and having a circular series of locking recesses; a cover for said gear case, in which said shaft is journaled and having a lock casing socket with which said locking recesses are adapted to successively register when said wheel is turned; a key lock including a body fitted to said casing socket and a transverse plunger which may be retracted into said body by the key of said lock to permit disengagement of said lock; said plunger having its outer end inclined so as to be thrust inward, automatically, when said body is manually thrust inward in said socket; a shoulder on said plunger arranged to bear against the wall of said socket; said plunger being constructed and arranged to be movable inwardly and outwardly independently of said key; and a spring in said body arranged to automatically effect engagement of said lock plunger, independently of said key, to prevent rattling and disengagement of said lock, when in locked position, and prevent relative rotation of said members, independently of said key; and means whereby said lock casing is prevented from turning with said rotary element.

3. The combination with a normally rotary steering wheel and a stationary gear case; of a shaft rigidly connected with said wheel and having a circular series of locking recesses; a cover for said gear case, in which said shaft is journaled and having a lock casing socket with which said locking recesses are adapted to successively register when said wheel is turned; a key lock including a body fitted to said casing socket and a transverse plunger which may be retracted into said body by the key of said lock to permit disengagement of said lock; a shoulder on said plunger arranged to bear against the wall of said socket; said plunger being constructed and arranged to be movable inwardly and outwardly independently of said key; and a spring in said body arranged to automatically effect engagement of said lock plunger, independently of said key, to prevent rattling and disengagement of said lock, when in locked position, and prevent relative rotation of said members, independently of said key; and means whereby said lock casing is prevented from turning with said rotary element.

4. The combination with a normally rotary steering wheel shaft having a circular series of locking recesses; of a member in which said shaft is journaled and having a lock casing socket with which said locking recesses are adapted to successively register when said shaft is turned; a key lock including a body fitted to radially reciprocate in said casing socket, with a key barrel mounted to rotate therein; the axis of said key barrel being parallel with but eccentric to the axis of said lock body and at the upper part of said body, so that the metal between said barrel and the circumference of said body is thinner at the top than at the bottom of said socket; said body having a longitudinal slot in its circumference extending parallel with its axis at said thinner, upper, part of said body; a stop screw in the top of said socket extending in said slot and limiting the reciprocatory movement of said body; a detent plunger mounted to reciprocate transversely in said body, which may be retracted into said body by the key of said lock to permit reciprocation of said body; said plunger having its outer end inclined so as to be thrust inwardly, automatically, when said body is manually thrust inward in said socket; said plunger being constructed and arranged to be movable inwardly and outwardly independently of said key; and a spring in said body arranged to automatically effect engagement of said plunger, independently of said key, to prevent disengagement of said lock, when in locked position.

5. The combination with a normally rotary steering wheel shaft having a circular series of locking recesses; of a member in which said shaft is journaled and having a lock casing socket with which said locking recesses are adapted to successively register when said shaft is turned; a key lock including a body fitted to radially reciprocate in said casing socket, with a key barrel mounted to rotate therein; the axis of said key barrel being parallel with but eccentric to the axis of said lock body and at the upper part of said body, so that the metal between said barrel and the circumference of said body is thinner at the top than at the bottom of said socket; said body having a longitudinal slot in its circumference extending parallel with its axis at said thinner, upper, part of said body; a stop screw in the top of said socket extending in said slot and limiting the reciprocatory movement of said body; a detent plunger mounted to reciprocate transversely in said body, which may be retracted into said body by the key of said lock to permit reciprocation of said body; said plunger having its outer end inclined so as to be thrust inwardly, automatically, when said body is manually thrust inward in said socket; a shoulder on said plunger arranged to bear against the wall of said socket; said plunger being constructed and arranged to be movable inwardly and outwardly independently of said key; and a spring in said body arranged to automatically effect engagement of said plunger, independently of said key, to prevent rattling and disengagement of said lock, when in locked position.

6. A pin tumbler key lock including a cylindrical body with a key barrel mounted to rotate therein; the axis of said barrel being parallel with but eccentric to the axis of said body; so that the wall of said body between said barrel and the circumference of said body is thinner at one side than at the other of said body; a cylindrical opening extending diametrically in said body only through the thick wall thereof; a plunger mounted to reciprocate in said opening, transversely to the axes of said body and barrel; the axis of said plunger intersecting the axes of said body and barrel; means whereby said plunger may be retracted into said body by turning said barrel with said key, including a crank on the inner end of said barrel, extending in a transverse slot in said plunger; said slot being of greater extent, longitudinally of said plunger, than the diameter of said crank fitted therein, whereby reciprocation of said plunger relatively to said crank is permitted and limited by the extent of said slot; and a spring in said body arranged to automatically project said plunger through the thicker wall of said body; said plunger having its outer end of reduced diameter forming a shoulder, and having its outer end inclined transversely to its axis, to such a degree that said plunger may be thrust inwardly by axial movement of said body with the inclined end of said plunger against a stationary member.

7. The combination with a cylindrical lock body, having, eccentric to but parallel with its axis, a cylindrical bore for a key barrel, and having a transverse, diametrically extending, bore for a plunger; the axis of the latter bore intersecting the axes of said body and barrel and opening through the thicker wall of said body; of a rotary key barrel in said first bore, having a crank at its inner end, extending into said second bore; a plunger in said second bore, having a transverse, segmental, slot in its circumference holding said crank, but of greater extent, longitudinally of said plunger, than the diameter of said crank; whereby said plunger is movable, longitudinally, both by said crank and independently of said crank; a cylindrical spring seat in said plunger, extending parallel with but eccentric to the plunger axis to such extent as to clear said slot; and a spring in said second bore, and seat, tending to project said plunger from said body to the inner limit of said slot; whereby said plunger may be retracted by rotation of said barrel and its crank, by a key inserted in said barrel, but is free to be thrust inward without rotation of said barrel.

8. A lock for an automobile steering mechanism gear wheel, including a lock body having a transversely extending plunger arranged to be retracted within the circumference of said body by a key inserted in a hole at one end of said body; said body having at the end thereof, opposite to the keyhole, a series of parallel grooves forming ridges between them, shaped to fit anywhere in a circumferential series of teeth of said gear, and arranged to thereby prevent rotation of said gear; and a spring arranged to automatically project said plunger to hold said body in locked position, directly engaging said gear.

9. In locking means for automobile steering mechanism, the combination with a normally rotary steering shaft having a circular series of locking recesses directly formed therein; the metal of said shaft between said recesses forming a gear; of a lock body arranged to reciprocate radially with respect to said shaft to engage and disengage said teeth; said body having, in unitary relation therewith at the inner end thereof, a series of corrugations including grooves and ridges extending transversely to the axis of said body and fitted to engage anywhere in the perimeter of said gear, with the teeth of the latter extending in the grooves of said lock body; a transversely extending plunger mounted to radially reciprocate in said body and arranged to be retracted by a key operated member in said body; said plunger having its outer end inclined toward the axis of said shaft; a casing forming a bearing for said shaft and lock body and having a recess adapted to receive the end of said plunger; whereby said mechanism may be locked, and said plunger automatically engaged with said recess, independently of any key, by thrusting said lock body toward said shaft; a key being required to release said plunger from said casing recess.

10. In locking means for automobile steering mechanism, the combination with a casing having a bearing for a steering shaft, a bearing for a lock body, extending radially with respect to said shaft, and a recess for a locking plunger extending parallel with said shaft; of a steering shaft mounted to rotate in said casing and provided with a circumferential series of locking recesses; a lock body mounted to reciprocate in said casing; a locking plunger mounted to reciprocate in said lock body and arranged to be retracted within the circumference of said body by a key operated member in said body; said plunger having its outer end inclined toward said shaft; whereby said mechanism may be locked, and said plunger automatically engaged with said recess, independently of said key, by thrusting said lock body toward said shaft; a key being required to release said plunger from said casing recess.

In testimony whereof, I have hereunto signed my name at Philadelphia, Pennsylvania, this twenty-fifth day of January, 1924.

ARTHUR E. PAIGE.